(12) United States Patent
Fernandez

(10) Patent No.: US 12,478,570 B2
(45) Date of Patent: Nov. 25, 2025

(54) COSMETIC FORMULATION

(71) Applicant: Victor Fernandez, Yonkers, NY (US)

(72) Inventor: Victor Fernandez, Yonkers, NY (US)

( * ) Notice: Subject to any disclaimer, the term of this patent is extended or adjusted under 35 U.S.C. 154(b) by 0 days.

(21) Appl. No.: 19/182,602

(22) Filed: Apr. 18, 2025

(65) Prior Publication Data
US 2025/0241836 A1 Jul. 31, 2025

(51) Int. Cl.
*A61K 8/60* (2006.01)
*A61K 8/34* (2006.01)
*A61K 8/44* (2006.01)
*A61K 8/73* (2006.01)
*A61Q 19/00* (2006.01)

(52) U.S. Cl.
CPC .............. *A61K 8/606* (2013.01); *A61K 8/345* (2013.01); *A61K 8/44* (2013.01); *A61K 8/731* (2013.01); *A61Q 19/00* (2013.01); *A61K 2800/51* (2013.01); *A61K 2800/522* (2013.01); *A61K 2800/5922* (2013.01); *A61K 2800/87* (2013.01)

(58) Field of Classification Search
None
See application file for complete search history.

(56) References Cited

FOREIGN PATENT DOCUMENTS

KR 2016003306 U * 9/2016 ........... A45D 44/002

OTHER PUBLICATIONS

Google translation KR 2016-0003306 U, printed 2025 (Year: 2025).*

* cited by examiner

*Primary Examiner* — Marianne C Seidel
*Assistant Examiner* — Alissa Prosser
(74) *Attorney, Agent, or Firm* — Joshua Kaplan Esq David Barman, Esq; Kaplan Law Practice LLC

(57) ABSTRACT

The present invention is a topical cosmetic formulation having six systems being solvent system of 90-94% w/w, humectant system of 4-6% w/w, emollient system of 0.3-0.5% w/w, anti-inflammatory system of 0.64-0.84% w/w, antioxidant system of 0.65-0.85% w/w, emulsion system of 0.18-0.26% w/w, along with adenosine present at 0.1-0.2% w/w and disodium EDTA present at 0.01-0.03% w/w in which each system provides components in specific synergistic ratios to maximize efficacy.

12 Claims, 3 Drawing Sheets

From A-A of Fig. 2

COSMETIC FORMULATION

BACKGROUND OF THE INVENTION

Cosmetic preparations have existed for thousands of years. There seems to be a never-ending quest to find improvements in various preparations. A significant number of cosmetic preparations are particularly formulated for facial application. While there have been numerous improvements in the chemicals, comprising these formulations, a deficiency still exists. Preparations comprising components that vary not in concentration but act in a synergistic manner are desirable as they will provide enhanced dermatological efficacy. The present invention addresses this need.

SUMMARY OF THE INVENTION

The formulations scientist is forever challenged with providing increasingly effective formulations. The formulations of the present invention provide for a topical cosmetic formulation that is differentiated from known formulations. The formulation is particularly suitable for facial application. There are six separate and distinct groups of components, each formulated with critically functional ratios of components, such that the ratios provide synergistic affects for each system individually, and an overall synergistic effect relating to the enhance functionality of the cosmetic system.

DETAILED DESCRIPTION OF THE INVENTION

Figure 1:
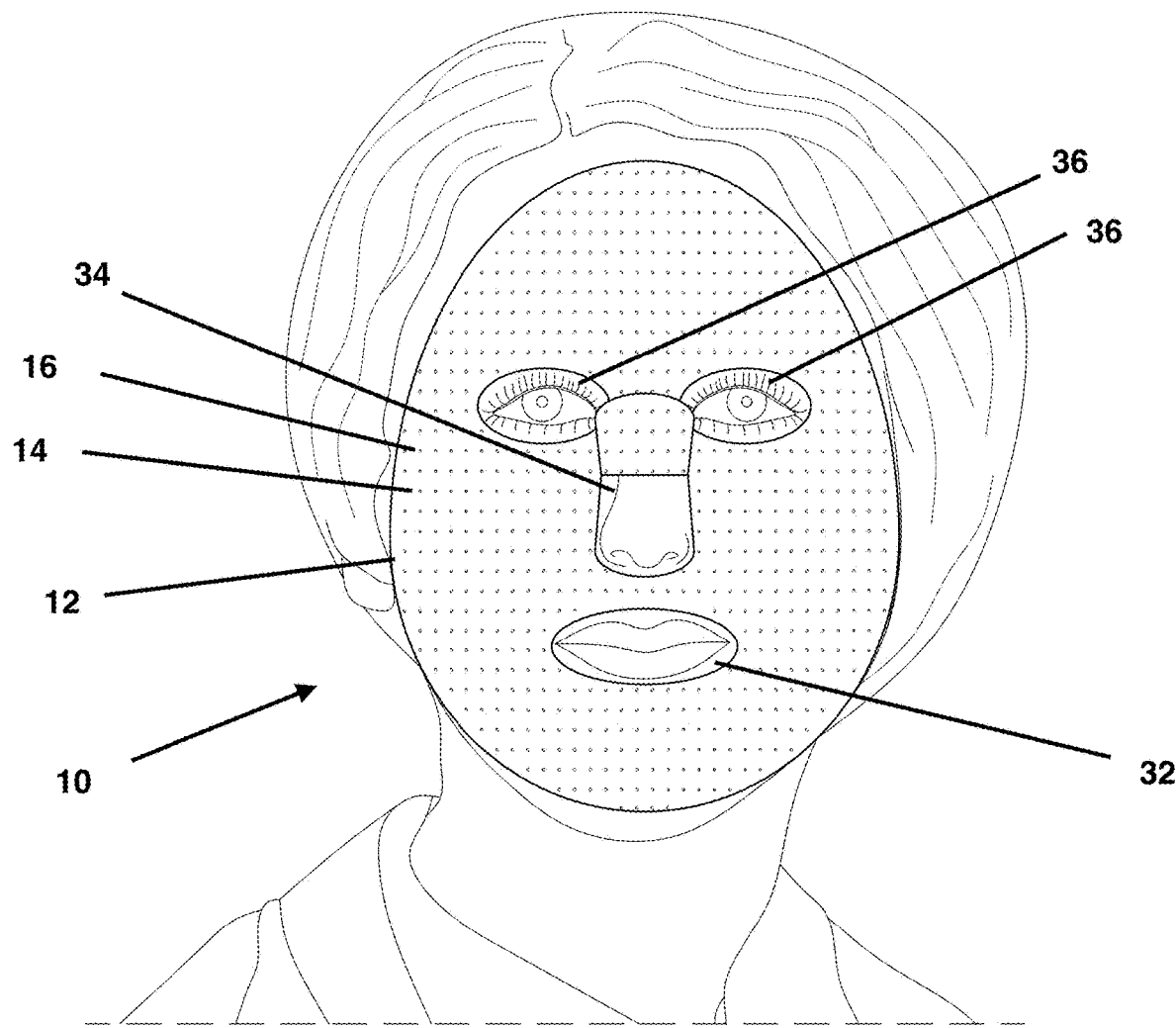
FIG. 1 is a plan view according to one embodiment of the present invention.
Figure 2:
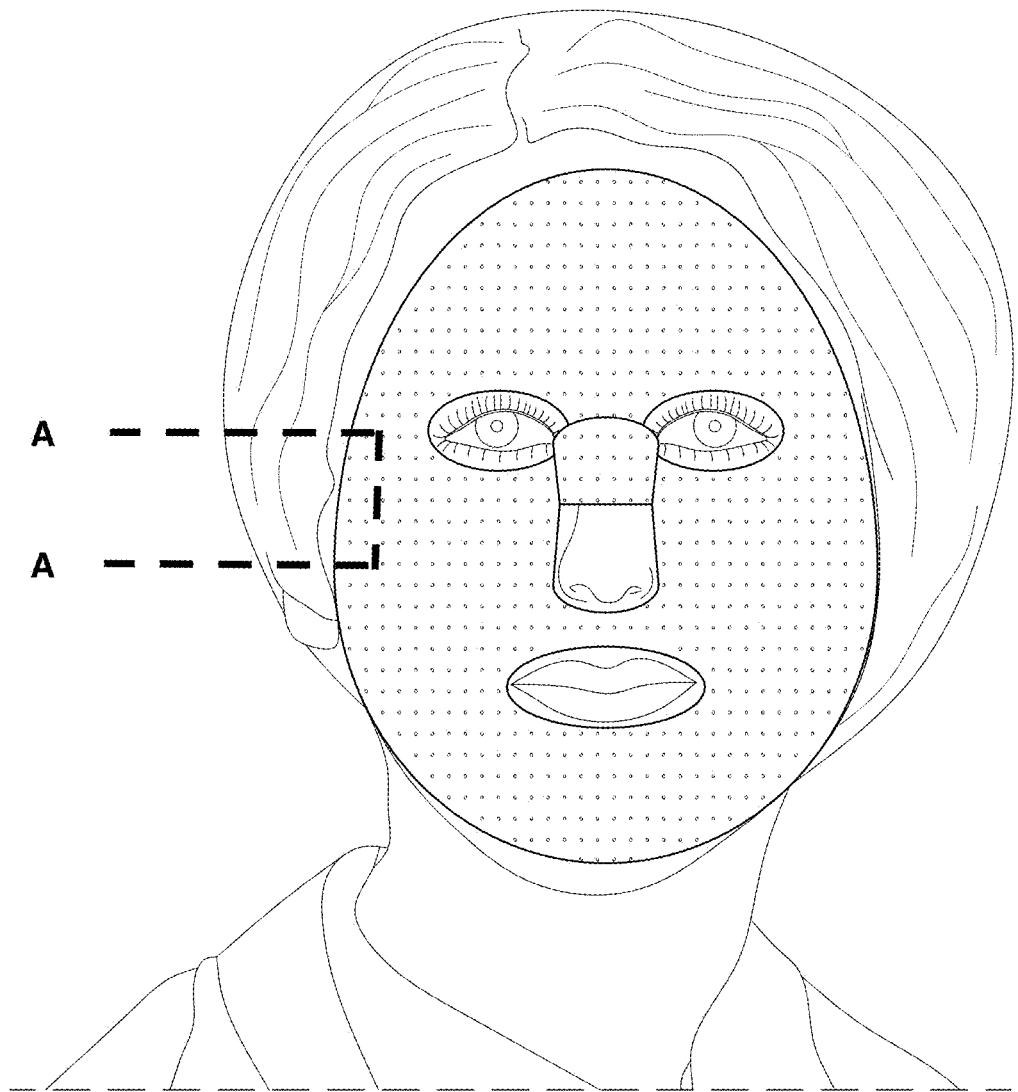
FIG. 2 is a plan view with section lines according to one embodiment of the present invention.
Figure 3:
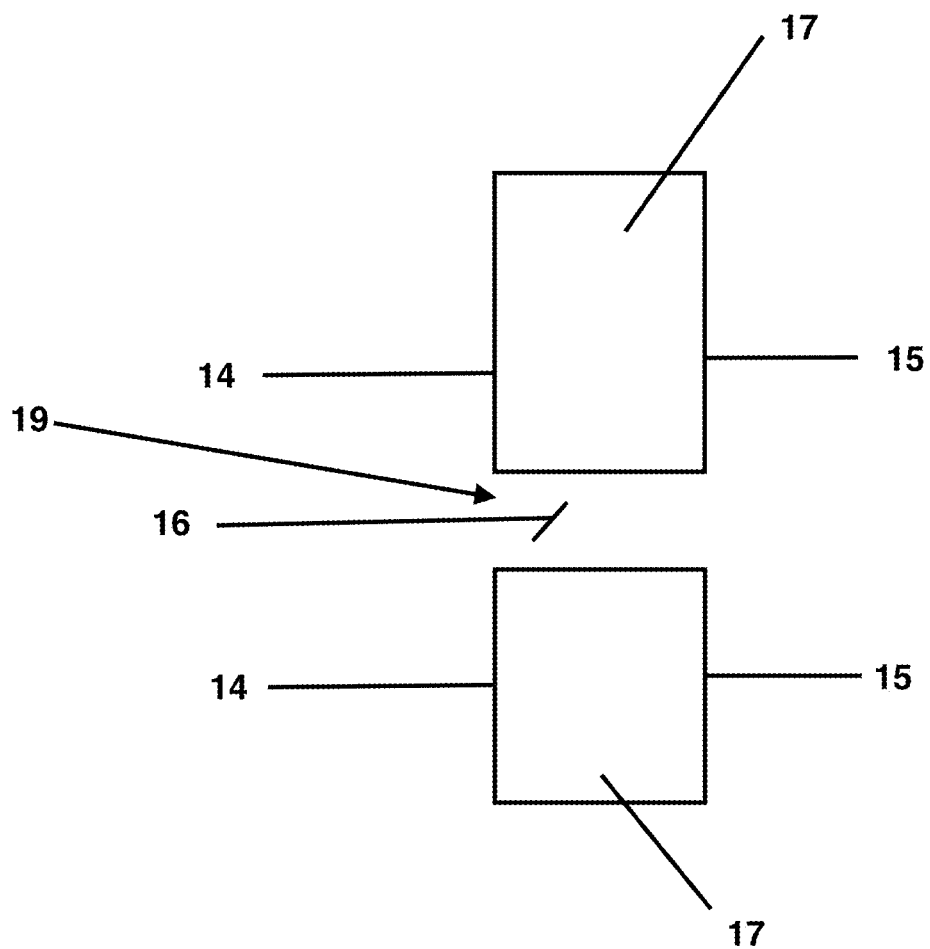
FIG. 3 is a partial cross section view along section lines A-A from FIG. 2 according to one embodiment of the present invention.

The present invention has discovered a unique combination of components that are present in synergistic ratios. It is not merely percentage composition that provides the efficiency of the present invention. The synergistic ratios are critical and have been discovered to provide enhanced results.

In one embodiment, the present invention comprises:

|  | CAS Number |
|---|---|
| Water | 7732-18-5 |
| 1,3-Propanediol | 504-63-2 |
| glycerin | 561-81-5 |
| hyaluronic acid | 9004-61-9 |
| 1,2-hexanediol | 6920-22-5 |
| Niacinamide | 98-92-0 |
| Simmondsia chinensis (jojoba) seed oil | 90045-98-0 |
| Gentiana Scabra Root Extract | 95193-52-5 |
| Centella asiatica extract | 84696-21-9 |
| Resveratrol | 501-36-0 |
| hydrogenated lecithin | 92128-87-5 |
| 1,2-butanediol | 584-03-2 |
| Chrysanthemum Parthenium (Feverfew) extract | 89997-65-9 |
| Camellia Sinensis Extract | 84650-60-2 |
| Allantoin | 97-59-6 |
| D-Panthenol | 81-13-0 |
| Adenosine | 58-61-7 |
| Acetyl Hexapeptide-8 | 616204-22-9 |
| Xanthan Gum | 11138-66-2 |
| Hydroxypropyl cellulose (HPC) | 9004-64-2 |
| Hydrolyzed sclerotium gum | 39464-87-4 |
| Disodium EDTA | 139-33-3 |
| Aloe Barbadensis Leaf Juice Powder | 85507-69-3 |
| Bisabolol | 515-69-5 |
| Polyethylene Glycol (PEG) - 40 | 25322-68-3 |

The components of the invention are identified by specificity with corresponding CAS numbers.

The synergistic formula of the present invention is a cosmetic formulation and is described here in as w/w of the system and the critical ratio of the components (in w/w) in each of the systems as well as the ratio of the systems as a whole one to another. Thus, the formulation of the cosmetic system of the present prevention is not merely trivialized as the selecting of a plurality of known ingredients. Each of the six identified systems of the formulation have critically important ratios of components, in order to optimize functionality of each system in a manner that has as of yet to be discovered or disclosed.

The formulation is divided into the following systems:

The Solvent system of the present invention includes 1,3-Propanediol and water in a ratio of 1,3-Propanediol: water of 1:10-11. In one embodiment, this ratio is 1:10.4-10.6. In one embodiment the ratio is 1:10.56875

The humectant system of the present invention includes Acetyl Hexapeptide-8, D-Panthenol, Allantoin, 1,2-butanediol, 1,2-hexanediol, hyaluronic acid, and glycerin. The ratio of components w/w in the humectant system of: Acetyl Hexapeptide-8, D-Panthenol: Allantoin, 1,2-butanediol: 1,2-hexanediol: hyaluronic acid: glycerin is 1:1:1:1-2:3-3.5:6-7:17-23. In one embodiment the ratio of components w/w in the humectant system of Acetyl Hexapeptide-8, D-Panthenol: Allantoin, 1,2-butanediol: 1,2-hexanediol: hyaluronic acid: glycerin is 1:1:1:1.3-1.4:3.25-3.4:19-21. In one embodiment the ratio of components w/w in the humectant system of Acetyl Hexapeptide-8, D-Panthenol: Allantoin, 1,2-butanediol: 1,2-hexanediol: hyaluronic acid: glycerin is 1:1:1:1.33:3.33:6.66:20.

The emollient system of the present invention includes polyethylene glycol 40 (PEG 40), hydrogenated lecithin, and Simmondsia chinensis (jojoba) seed oil. The ratio of components w/w in the emollient system of the polyethylene glycol 40 (PEG 40):hydrogenated lecithin: Simmondsia chinensis (jojoba) seed oil is 1:8-12:20-30. In one embodiment, the ratio of components w/w in the emollient system of the polyethylene glycol 40 (PEG 40):hydrogenated lecithin: Simmondsia chinensis (jojoba) seed oil is 1:10:25.

The anti-inflammatory system of the present invention includes Bisabolol, Aloe Barbadensis Leaf Juice Powder, Chrysanthemum Parthenium (Feverfew) extract, and Niacinamide. The ratio of components w/w in the anti-inflammatory system of Bisabolol:Aloe Barbadensis Leaf Juice Powder:Chrysanthemum Parthenium (Feverfew) extract is Niacinamide 1:1:8-12:20-30. In one embodiment, the ratio of components w/w in the anti-inflammatory system of Bisabolol:Aloe Barbadensis Leaf Juice Powder:Chrysanthemum Parthenium (Feverfew) extract is 1:1:10:25.

The antioxidant system of the present invention includes Camellia Sinensis Extract, Resveratrol, Centella asiatica extract, and Gentiana Scabra Root Extract. The ratio of components w/w in the antioxidant system of Camellia

*Sinensis* Extract:Resveratrol:*Centella asiatica* extract:*Gentiana Scabra* Root Extract is 1:1-2:1-2:1-2. In one embodiment, the ratio of components w/w in the antioxidant system of *Camellia Sinensis* Extract:Resveratrol:*Centella asiatica* extract:*Gentiana Scabra* Root Extract is 1:1.2-1.4:1.2-1.4: 1.2-1.4. In one embodiment, the ratio of components w/w in the antioxidant system of *Camellia Sinensis* Extract:Resveratrol: *Centella asiatica* extract:*Gentiana Scabra* Root Extract is 1:1.33:1.33:1.33.

The emulsion system of the present invention includes Hydrolyzed *sclerotium* gum, Hydroxypropyl cellulose (HPC), and Xanthan Gum. The ratio of components w/w in the emulsion system of Hydrolyzed *sclerotium* gum:Hydroxypropyl cellulose (HPC):Xanthan Gum is 1:4-6:4-6. In one embodiment, the ratio of components w/w in the emulsion system of Hydrolyzed *sclerotium* gum:Hydroxypropyl cellulose (HPC):Xanthan Gum is 1:5:5.

Adenosine is included in the formulation from 0.1-0.2% w/w of the total cosmetic formulation. Adenosine is known as a component that stimulates collagen production, improves skin elasticity, and promotes cellular turnover. In one embodiment, it is included at 0.15% w/w of the total cosmetic formulation. Although Adenosine is generally regarded as safe up to 1% w/w in cosmetics and is typically found in concentrations 0.1-0.5% w/w, it is further been discovered that the combination of adenosine with the antioxidant system of the current formulation in a ratio of adenosine:antioxidant system of 1:5 provide a synergy effect and enhances the efficacy of adenosine in a manner typically associated with concentrations 200-600% higher than that of the present formulation.

The formulation includes Disodium EDTA as a chelating and stabilizing agent. It is typically present w/w based on the total cosmetic formulation in 0.01-0.05%. In one embodiment, Disodium EDTA is present w/w based on the total cosmetic formulation at 0.02%.

The total of the cosmetic formulation of the present invention includes the six individual systems combined with adenosine and disodium EDTA. As is understood in the art, the cosmetic formulation includes the combination of the solvent system, the humectant system, the emollient system, the anti-inflammatory system, the antioxidant system, the emulsion system, adenosine and disodium EDTA.

In one embodiment, the formulation includes w/w:
the solvent system, 90-94%
the humectant system, 4-6%
the emollient system, 0.3-0.5%
the anti-inflammatory system, 0.64-0.84%
the antioxidant system, 0.65-0.85%
the emulsion system, 0.18-0.26%
adenosine 0.1-0.2%
disodium EDTA 0.01-0.03%
In one embodiment, the formulation consists of:
the solvent system in a ratio of 1,3-Propanediol: water of 1:10.56875;
the humectant system in a ratio of: Acetyl Hexapeptide-8, D-Panthenol: Allantoin, 1,2-butanediol: 1,2-hexanediol: hyaluronic acid: glycerin is 1:1:1:1.33:3.33:6.66: 20;
the emollient system in a ratio of polyethylene glycol 40 (PEG 40): hydrogenated lecithin: *Simmondsia chinensis* (jojoba) seed oil is 1:10:25;
the anti-inflammatory system in a ratio of Bisabolol: Aloe Barbadensis Leaf Juice Powder: *Chrysanthemum parthenium* (Feverfew) extract is 1:1:10:25;
the antioxidant system in a ratio of *Camellia sinensis* Extract: Resveratrol: *Centella asiatica* extract: *Gentiana scabra* Root Extract is 1:1.2-1.4:1.2-1.4:1.2-1.4;
the emulsion system in a ratio of Hydrolyzed *sclerotium* gum: Hydroxypropyl cellulose (HPC): Xanthan Gum is 1:5:5;
adenosine 0.15% w/w of the total formulation; and
disodium EDTA 0.02% w/w of the total formulation.
In one embodiment, the formulation consists of w/w:
the solvent system, 92.55%
the humectant system, 5.15%
the emollient system, 0.42%
the anti-inflammatory system, 0.74%
the antioxidant system, 0.75%
the emulsion system, 0.22%
adenosine 0.15%
disodium EDTA 0.02%

The particulars of combining the six functional systems along with adenosine and disodium EDTA are well within the skill of knowledgeable, formulations scientist.

In one embodiment the present invention is a method utilizing a face mask as demonstrated in the drawings.

Face mask 10 has a peripheral edge 12. Face mask 10 is formed of a main body 17 having a proximal surface 15 and distal surface 14. Main body 17 has a plurality of application cavities 16 positioned on most of the face mask 10. Face mask cavities 16 are constructed and arranged such that when a formulation composition according to the present invention is applied to distal surface 14, the composition passes through application cavities 16 and deposits composition on the face of a user wearing face mask 10. Face mask 10 is further constructed having a mouth cavity 32, nose cavity 34 and a pair of eye cavities 36. The applied formulation passes through application cavities 16 along the direction of application path 19.

The method of the present invention comprises the steps of:
providing a face mask having a main body comprising a proximal surface, a distal surface a plurality of application cavities, a mouth cavity, nose cavity, and a pair of eye cavities;
positioning said face mask on a user's face;
applying a composition according to said distal surface of said face mask, said applying resulting in said composition passing through said application cavities of said face mask and upon said user's face;
removing said face mask from said user's face;
removing said composition passing through said application cavities of said face mask from upon said user's face.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

The invention claimed is:
1. A topical cosmetic formulation comprising:
a solvent system of 1,3-propanediol and water in a weight ratio of 1,3-propanediol: water of 1:10-11, in an amount of 90-94% w/w;
a humectant system of acetyl hexapeptide-8, D-panthenol, allantoin, 1,2-butanediol, 1,2-hexanediol, hyaluronic acid, and glycerin in a weight ratio of acetyl hexapeptide-8: D-panthenol: allantoin: 1,2-butanediol: 1,2- hexanediol: hyaluronic acid: glycerin of 1:1:1:1-2:3-3.5:6-7:17-23, in an amount of 4-6% w/w;
an emollient system of polyethylene glycol 40 (PEG 40), hydrogenated lecithin, and *Simmondsia chinensis* (jojoba) seed oil in a weight ratio of polyethylene glycol 40 (PEG 40): hydrogenated lecithin: *Simmondsia chinensis* (jojoba) seed oil of 1:8-12:20-30, in an amount of 0.3-0.5% w/w;
an anti-inflammatory system of bisabolol, aloe barbadensis leaf juice powder, *Chrysanthemum parthenium* (Feverfew) extract, and niacinamide in a weight ratio of bisabolol: aloe barbadensis leaf juice powder: *Chrysanthemum parthenium* (Feverfew) extract: niacinamide of 1:1:8-12:20-30, in an amount of 0.64-0.84% w/w;
an antioxidant system of *Amellia sinensis* extract, resveratrol, *Centella asiatica* extract, and *Gentiana scabra* root extract in a weight ratio of *Camellia sinensis* extract: resveratrol: *Centella asiatica* extract: *Gentiana scabra* root extract of 1:1-2:1-2:1-2, in an amount of 0.65-0.85% w/w;
an emulsion system of hydrolyzed *sclerotium* gum, hydroxypropyl cellulose (HPC), and xanthan gum in a weight ratio of hydrolyzed *sclerotium* gum: hydroxypropyl cellulose (HPC): xanthan gum of 1:4-6:4-6, in an amount of 0.18-0.26% w/w;
adenosine 0.1-0.2% w/w; and
disodium ethylenediaminetetraacetic acid (EDTA) 0.01-0.03% w/w.

2. The formulation of claim 1 wherein said solvent system of 1,3-propanediol and water is in a weight ratio of 1,3-propanediol: water of 1:10.4-10.6.

3. The formulation of claim 1 wherein said solvent system of 1,3-propanediol and water is in a weight ratio of 1,3-propanediol: water of 1:10.56875.

4. The formulation of claim 1 wherein said humectant system of acetyl hexapeptide-8, D-panthenol, allantoin, 1,2-butanediol, 1,2-hexanediol, hyaluronic acid, and glycerin is in a weight ratio of hydrolyzed *sclerotium* gum: acetyl hexapeptide-8: D-panthenol: allantoin: 1,2-butanediol: 1,2-hexanediol: hyaluronic acid: glycerin of 1:1:1:1.33:3.33:6.66:20.

5. The formulation of claim 1 wherein said emollient system of polyethylene glycol 40 (PEG 40), hydrogenated lecithin, and *Simmondsia chinensis* (jojoba) seed oil is in a weight ratio of polyethylene glycol 40 (PEG 40): hydrogenated lecithin: *Simmondsia chinensis* (jojoba) seed oil of 1:10:25.

6. The formulation of claim 1 wherein said anti-inflammatory system of bisabolol, aloe barbadensis leaf juice powder, *Chrysanthemum parthenium* (Feverfew) extract, and niacinamide is in a weight ratio of bisabolol: aloe barbadensis leaf juice powder: *Chrysanthemum parthenium* (Feverfew) extract: niacinamide of 1:1:10:25.

7. The formulation of claim 1 wherein said antioxidant system of *Camellia sinensis* extract, resveratrol, *Centella asiatica* extract, and *Gentiana scabra* root extract is in a weight ratio of *Camellia sinensis* extract: resveratrol: *Centella asiatica* extract: *Gentiana scabra* root extract of 1:1.2-1.4:1.2-1.4:1.2-1.4.

8. The formulation of claim 1 wherein said antioxidant system of *Camellia sinensis* extract, resveratrol, *Centella asiatica* extract, and *Gentiana scabra* root extract is in a weight ratio of *Camellia sinensis* extract: resveratrol: *Centella asiatica* extract: *Gentiana scabra* root extract of 1:1.33:1.33:1.33.

9. The formulation of claim 1 wherein said emulsion system of hydrolyzed *sclerotium* gum, hydroxypropyl cellulose (HPC), and xanthan gum is in a weight ratio hydrolyzed *sclerotium* gum: hydroxypropyl cellulose (HPC): xanthan gum of 1:5:5.

10. The formulation of claim 1 wherein said adenosine is 0.15% w/w of said formulation.

11. The formulation of claim 1 wherein said disodium EDTA is 0.02% w/w of said formulation.

12. A formulation consisting of:
a solvent system of 1,3-propanediol and water in a weight ratio of 1,3-propanediol: water of 1:10.56875, in an amount of 92.55% w/w;
a humectant system of acetyl hexapeptide-8, D-panthenol, allantoin, 1,2-butanediol, 1,2-hexanediol, hyaluronic acid, and glycerin in a weight ratio of hydrolyzed *sclerotium* gum: acetyl hexapeptide-8: D-panthenol: allantoin: 1,2-butanediol: 1,2-hexanediol: hyaluronic acid: glycerin of 1:1:1:1.33:3.33:6.66:20, in an amount of 5.15% w/w;
an emollient system of polyethylene glycol 40 (PEG 40), hydrogenated lecithin, and *Simmondsia chinensis* (jojoba) seed oil in a weight ratio of polyethylene glycol 40 (PEG 40): hydrogenated lecithin: *Simmondsia chinensis* (jojoba) seed oil of 1:10:25, in an amount of 0.42% w/w;
an anti-inflammatory system of bisabolol, aloe barbadensis leaf juice powder, *Chrysanthemum parthenium* (Feverfew) extract, and niacinamide in a weight ratio of bisabolol: aloe barbadensis leaf juice powder: *Chrysanthemum parthenium* (Feverfew) extract: niacinamide of 1:1:10:25, in an amount of 0.74% w/w;
an antioxidant system of *Camellia sinensis* extract, resveratrol, *Centella asiatica* extract, and *Gentiana scabra* root extract in a weight ratio of *Camellia sinensis* extract: resveratrol: *Centella asiatica* extract: *Gentiana scabra* root extract of 1:1.33:1.33:1.33, in an amount of 0.75% w/w;
an emulsion system of hydrolyzed *sclerotium* gum, hydroxypropyl cellulose (HPC), and xanthan gum in a weight ratio of hydrolyzed *sclerotium* gum: hydroxypropyl cellulose (HPC): xanthan gum of 1:5:5, in an amount of 0.22% w/w;
adenosine 0.15% w/w; and
disodium EDTA 0.02% w/w.

* * * * *